United States Patent
Arque Saleta

(10) Patent No.: US 11,900,199 B2
(45) Date of Patent: Feb. 13, 2024

(54) RFID DEVICE AND METHOD FOR MANUFACTURING THE RFID DEVICE

(71) Applicant: Comercial Arque, S.A, Hospitalet de Llobregat (ES)

(72) Inventor: Damià Arque Saleta, Barcelona (ES)

(73) Assignee: Comercial Arque, S.A, Hospitalet de Llobregat (ES)

( * ) Notice: Subject to any disclaimer, the term of this patent is extended or adjusted under 35 U.S.C. 154(b) by 10 days.

(21) Appl. No.: 17/601,986

(22) PCT Filed: Apr. 10, 2019

(86) PCT No.: PCT/ES2019/070246
§ 371 (c)(1),
(2) Date: Oct. 7, 2021

(87) PCT Pub. No.: WO2020/208269
PCT Pub. Date: Oct. 15, 2020

(65) Prior Publication Data
US 2022/0164622 A1    May 26, 2022

(51) Int. Cl.
*G06K 19/077* (2006.01)
*G06K 19/02* (2006.01)
*G06K 19/07* (2006.01)

(52) U.S. Cl.
CPC ..... *G06K 19/07722* (2013.01); *G06K 19/025* (2013.01); *G06K 19/027* (2013.01); *G06K 19/0723* (2013.01)

(58) Field of Classification Search
CPC ........... G06K 19/07722; G06K 19/025; G06K 19/027

USPC ....................................................... 235/488
See application file for complete search history.

(56) References Cited

U.S. PATENT DOCUMENTS

| | | | |
|---|---|---|---|
| 8,517,850 B1 * | 8/2013 | Beno | A63B 60/42 473/221 |
| 10,262,172 B1 * | 4/2019 | Niranjayan | G06K 7/10326 |
| 2005/0059308 A1 | 3/2005 | Parsons | |
| 2007/0211398 A1 | 9/2007 | Whitney | |
| 2008/0246589 A1 | 10/2008 | Yadav et al. | |
| 2011/0000970 A1 | 1/2011 | Abraham | |
| 2012/0234921 A1 | 9/2012 | Tiedmann et al. | |
| 2017/0243101 A1 * | 8/2017 | Geissinger | H01Q 1/38 |
| 2018/0021184 A1 * | 1/2018 | Monson | A61G 7/015 340/573.5 |
| 2021/0354411 A1 * | 11/2021 | Uijlenbroek | B29D 30/0606 |
| 2023/0038621 A1 * | 2/2023 | Gogotsi | H04B 1/18 |

FOREIGN PATENT DOCUMENTS

| | | |
|---|---|---|
| DE | 10310238 | 9/2004 |
| WO | WO 2020/208269 | 10/2020 |

OTHER PUBLICATIONS

International Search Report and the Written Opinion dated Dec. 17, 2019 From the International Searching Authority Re. Application No. PCT/ES2019/070246. (12 Pages).

* cited by examiner

*Primary Examiner* — Allyson N Trail

(57) ABSTRACT

The invention relates to an RFID device comprising:
a layer of flexible laminar material, comprising:
an outer face, and
an inner face, and
an RFID tag, fixed to the inner face of the layer.
Said inner face comprises a coating, with the RFID tag being encapsulated between the inner face and the coating.

13 Claims, 2 Drawing Sheets

RFID DEVICE AND METHOD FOR MANUFACTURING THE RFID DEVICE

RELATED APPLICATION

This application is a National Phase of PCT Patent Application No. PCT/ES2019/070246 having International filing date of Apr. 10, 2019, the contents of which are incorporated herein by reference in their entirety.

FIELD AND BACKGROUND OF THE INVENTION

The present invention is comprised in the general field of recording media, and particularly relates to a radio frequency identification (RFID) device comprising, among other components, an RFID tag.

In recent years, RFID technology has experienced significant development, primarily in widespread use in multiple sectors of industry, such as logistics, marketing, etc. One of the main objectives of these technologies is to adapt these devices to their different uses, providing them with greater flexibility, strength and protection.

In this sense, the device generally comprises two fabrics which are coated on their outer faces, and an RFID antenna is included adhered to the inner face or to both inner faces of said fabrics. Devices of this type provide protection against external conditions, however, given that they are two fabrics, in the mid- and short-term, both layers end up separating such that the RFID antenna is exposed to the exterior, giving rise to defects in the use thereof; furthermore, these devices are not entirely valid for tags made of aluminium.

Therefore, there is a need to provide an RFID device which allows a prolonged use over time, that is flexible but provides insulation against the extreme conditions that are characteristic of chemical and thermal treatments, such that it can be applied in various textile garments so that their traceability can be checked, which withstand the thermal and chemical treatments which are applied to the specific garments without damaging the RFID antenna.

SUMMARY OF THE INVENTION

The present invention provides an RFID device which solves the problems described in the state of the art. This is because it relates to an RFID device comprising a single layer of material flexible on which the RFID tag is adhered, with an outer coating which protects the layer of material flexible and the RFID tag such that, since it is a single layer, separation over time does not occur, less coating is needed and it is therefore more environmentally friendly.

Therefore, in a first aspect, the present invention relates to an RFID device comprising:
  a layer of flexible laminar material, comprising:
    an outer face, and
    an inner face, and
  an RFID tag, fixed to the inner face of the layer,
wherein the inner face comprises a coating, with the RFID tag being encapsulated between the inner face and the coating.

In the present invention, RFID tag refers to a medium including an RFID antenna comprising the identification data of the product which includes it, a radio transducer and a chip.

In a particular embodiment, the RFID tag comprises an antenna made of aluminium.

In a particular embodiment of the present invention, the layer of flexible laminar material is a textile material.

In the present invention, textile material refers to non-woven textile material and woven textile material.

In a particular embodiment of the present invention, the RFID tag is fixed to the inner face of the layer by means of an adhesive.

In a particular embodiment of the present invention, the outer face of the layer of flexible laminar material comprises a second coating. More particularly, the coating and the second coating are of the same material. More particularly, the coating is a polyurethane-based polymer.

In a particular embodiment of the present invention, the coating and the second coating are a thermoplastic polymer. More particularly, the coating and the second coating are a polymer selected from polyethylene, polyvinyl chloride, polypropylene, polystyrene and polyurethane.

In another particular embodiment of the present invention, the device comprises a second layer of flexible laminar material sandwiched between the coating and the inner face, wherein the second layer of flexible laminar material is additionally sandwiched between the coating and the RFID tag.

In another aspect, the present invention relates to the method of obtaining the RFID device of the present invention (hereinafter method of the present invention), which comprises applying a coating to a layer of flexible laminar material containing an RFID tag adhered to its inner face, with the RFID tag being encapsulated between the coating and the inner face of the flexible laminar material and then drying the layer of coating.

In a particular embodiment, the method of the present invention comprises a step before step a) for fixing the RFID tag to the layer of flexible laminar material. More particularly, the fixing of the RFID tag to the layer of flexible laminar material is by means of adhesive.

In another particular embodiment, the method of the present invention comprises a step before step a) for applying a second coating to the outer face of the layer of flexible laminar material.

In another aspect, the present invention relates to the use of the RFID device of the present invention in textile garments.

DESCRIPTION OF SPECIFIC EMBODIMENTS OF THE INVENTION

Figure 1:
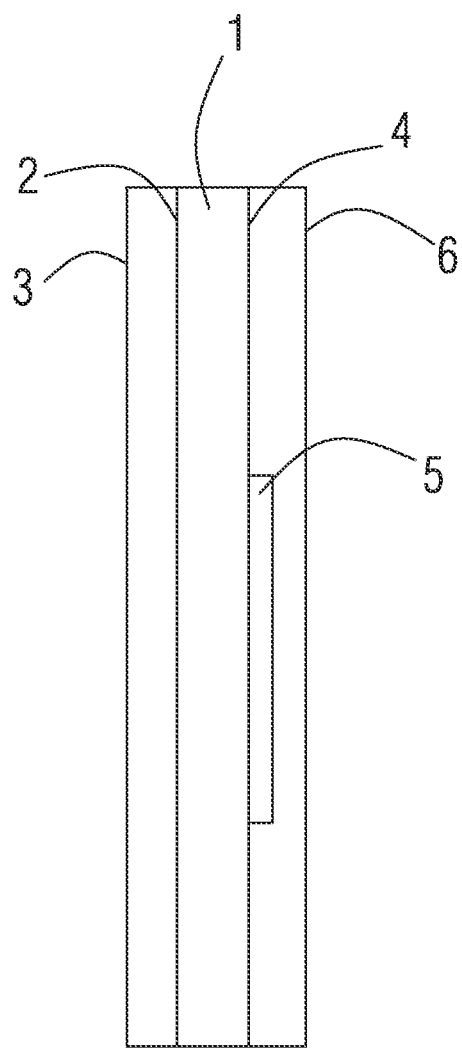
FIG. 1 shows a longitudinal cross section of a preferred embodiment of the RFID device of the present invention.

A first embodiment of the present invention, as defined in FIG. 1, relates to an RFID device comprising a layer of a textile (1) as the flexible laminar material, with an outer face (2) and an inner face (4), with an RFID tag (5) fixed to said inner face (4) and said inner face (4) further comprising a coating (6) of polyurethane, such that the RFID tag is encapsulated between the inner face (4) and the coating (6) of polyurethane. Additionally, the outer face (2) comprises a second coating (3) of polyurethane.

Figure 2:
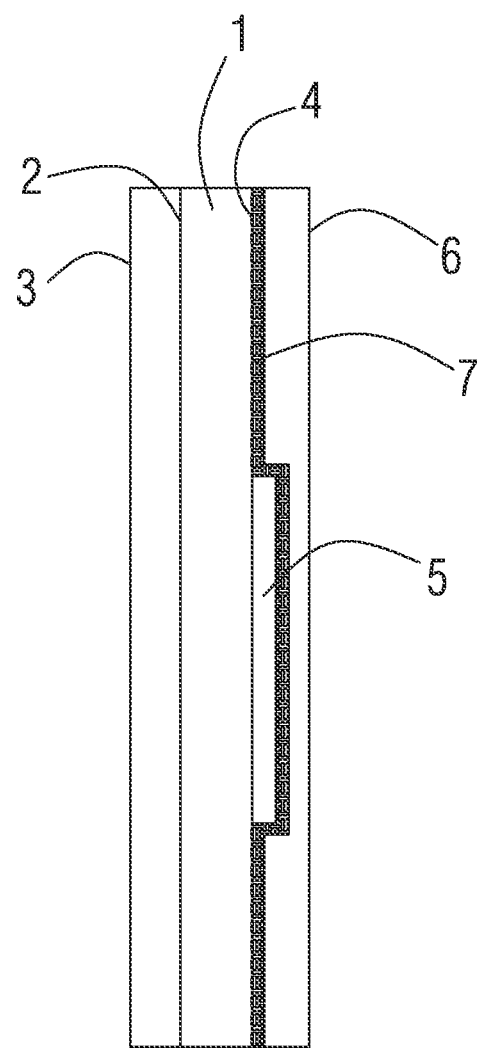
FIG. 2 shows a longitudinal cross section of a second embodiment of the RFID device of the present invention.

In a second embodiment, as defined in FIG. 2, the present invention relates to an RFID device comprising a layer of a textile (1) as the flexible laminar material, with an outer face (2) and an inner face (4), with an RFID tag (5) fixed to said inner face (4) and said inner face (4) further comprising a coating (6) of polyurethane, wherein the device additionally comprises a second layer (7) of cellulose as the flexible laminar material sandwiched between the coating (6) of polyurethane and the inner face (4), wherein the second layer (7) of cellulose is additionally sandwiched between the coating (6) of polyurethane and the RFID tag (5). Additionally, the outer face (2) comprises a second coating (3) of polyurethane.

The invention claimed is:

1. An RFID device comprising:
   a single layer (1) of flexible laminar material, comprising:
      an outer face (2), and
      an inner face (4), and
   an RFID tag (5), fixed to the inner face (4) of the single layer (1),
   wherein the inner face (4) comprises a coating (6) of thermoplastic polymer, with the RFID tag (5) being encapsulated between the inner face (4) and the coating (6);
      wherein the single layer (1) of flexible laminar material is a layer of textile material.

2. The RFID device according to claim 1, wherein the single-layer (1) of flexible laminar material is a textile material.

3. The RFID device according to claim 1, wherein the RFID tag is fixed to the inner face (4) of the single layer (1) by an adhesive.

4. The RFID device according to claim 1, wherein the coating (6) is a thermoplastic polymer.

5. The RFID device according to claim 4, wherein the thermoplastic polymer is polyurethane.

6. The RFID device according to claim 1, wherein the outer face (2) of the single layer (1) of flexible laminar material comprises a second coating (3).

7. The RFID device according to the claim 6, wherein the coating (6) and the second coating (3) are of the same material.

8. The RFID device according to claim 1, wherein the device comprises a second layer (7) of flexible laminar material sandwiched between the coating (6) and the inner face (4), wherein the second layer (7) of flexible laminar material is additionally sandwiched between the coating (6) and the RFID tag (5).

9. The RFID device according to claim 1, wherein the RFID tag is made of aluminium.

10. A method for preparing an RFID device according to claim 1, comprising the following steps:
    a) applying a coating (6) on the single layer (1) of flexible laminar material containing an RFID tag (5) adhered to its inner face (4), with the RFID tag (5) being encapsulated between the coating (6) and the inner face (4) of the flexible laminar material,
    b) drying the layer of coating (6).

11. The method according to claim 10, comprising a step before step a) for fixing the RFID tag to the single layer (1) of flexible laminar material.

12. The method according to claim 11, wherein the fixing of the RFID tag to the single layer (1) of flexible laminar material is by adhesive.

13. The method according to claim 10, comprising a step before step a) for applying a second coating (3) to the outer face (2) of the single layer (1) of flexible laminar material.

* * * * *